(12) United States Patent
Singh et al.

(10) Patent No.: US 12,603,911 B2
(45) Date of Patent: Apr. 14, 2026

(54) SYSTEM FOR INTELLIGENT AUTOMATED SIMULATION OF PENETRATION TESTING AND ISOLATION OF VULNERABLE DISTRIBUTED ELECTRONIC DATA REGISTERS

(71) Applicant: BANK OF AMERICA CORPORATION, Charlotte, NC (US)

(72) Inventors: Shailendra Singh, Maharashtra (IN); Krishna Rangarao Mamadapur, Pune (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 298 days.

(21) Appl. No.: 18/237,980

(22) Filed: Aug. 25, 2023

(65) Prior Publication Data

US 2025/0071134 A1  Feb. 27, 2025

(51) Int. Cl.
*H04L 9/40* (2022.01)

(52) U.S. Cl.
CPC ........ *H04L 63/1433* (2013.01); *H04L 63/205* (2013.01)

(58) Field of Classification Search
CPC . H04L 63/0263; H04L 63/1433; H04L 63/20; H04L 63/205; H04L 67/1097; G06F 3/067
See application file for complete search history.

(56) References Cited

U.S. PATENT DOCUMENTS

| | | | |
|---|---|---|---|
| 8,468,244 B2 | 6/2013 | Redlich | |
| 9,594,907 B2 | 3/2017 | Duke | |

(Continued)

FOREIGN PATENT DOCUMENTS

| | | | | |
|---|---|---|---|---|
| AU | 2023202044 B2 | * | 9/2024 | ............. H04L 63/20 |
| EP | 3844927 B1 | * | 7/2025 | ......... H04L 63/1433 |
| GB | 2544803 A | * | 5/2017 | ............. G06F 21/55 |

OTHER PUBLICATIONS

Chithanuru et al. "An anomaly detection on blockchain infrastructure using artificial intelligence techniques: Challenges and future directions—A review" [Online], Apr. 19, 2023 [Retrieved on: Aug. 15, 2025], Retrieved from: < https://onlinelibrary.wiley.com/doi/full/10.1002/cpe.7724 > (Year: 2023).*

*Primary Examiner* — Eric W Shepperd
(74) *Attorney, Agent, or Firm* — Moore & Van Allen PLLC; Nicholas C. Russell

(57) ABSTRACT

A system is provided for intelligent automated simulation of penetration testing and isolation of vulnerable distributed electronic data registers. In particular, the system may extract metadata regarding one or more nodes or sections of a distributed register. Based on the metadata, the system may generate a knowledge graph that may indicate the vulnerabilities associated with particular nodes, blocks, and/or sections of the distributed register. Based on the knowledge graph, the system may compute vulnerability scores for the various nodes, blocks, and/or sections, and generate a vulnerability heatmap based on the scores. The system may further be configured to allow a user to perform automatic simulated penetration tests on the vulnerable portions of the distributed register and/or execute one or more remediation process on such vulnerable portions. In this way, the system provides an efficient way to identify and remediate vulnerabilities within a distributed register.

19 Claims, 6 Drawing Sheets

(56)            References Cited

U.S. PATENT DOCUMENTS

| | | | |
|---|---|---|---|
| 9,628,501 | B2 | 4/2017 | Datta Ray |
| 9,696,346 | B2 | 7/2017 | Pietrowicz |
| 9,996,567 | B2 | 6/2018 | Smart |
| 10,250,619 | B1 | 4/2019 | Park |
| 10,558,800 | B2 | 2/2020 | Ray |
| 10,620,241 | B2 | 4/2020 | Pietrowicz |
| 10,681,074 | B2 | 6/2020 | Crabtree |
| 10,944,795 | B2 | 3/2021 | Crabtree |
| 10,965,711 | B2 | 3/2021 | Schiappa |
| 11,025,674 | B2 | 6/2021 | Crabtree |
| 11,216,265 | B1 | 1/2022 | Hornbeck |
| 11,388,184 | B2 * | 7/2022 | Siddiq ..................... H04L 63/20 |
| 11,463,467 | B2 * | 10/2022 | Rodriguez Bravo ........................ G06F 21/6245 |
| 11,526,614 | B2 * | 12/2022 | Fang ................... H04L 63/1433 |
| 2018/0278631 | A1 | 9/2018 | Harris |
| 2019/0014141 | A1 | 1/2019 | Segal |
| 2019/0132350 | A1 * | 5/2019 | Smith ..................... G06F 21/60 |
| 2019/0245882 | A1 * | 8/2019 | Kesavan ................ G06N 3/006 |
| 2019/0386969 | A1 | 12/2019 | Verzun |
| 2020/0389495 | A1 | 12/2020 | Crabtree |
| 2020/0396231 | A1 * | 12/2020 | Krebs ................. H04L 63/1425 |
| 2020/0412767 | A1 | 12/2020 | Crabtree |
| 2021/0168175 | A1 * | 6/2021 | Crabtree .............. G06F 16/951 |
| 2021/0385124 | A1 * | 12/2021 | Roy .................... H04L 43/0823 |
| 2022/0092587 | A1 * | 3/2022 | Jevans ................ G06Q 20/405 |
| 2022/0222350 | A1 * | 7/2022 | Franzen ............... G06F 11/321 |
| 2022/0247678 | A1 | 8/2022 | Atwal |
| 2022/0247775 | A1 * | 8/2022 | Shake .................. H04L 43/045 |
| 2022/0279012 | A1 * | 9/2022 | Seetharamaiah ... H04L 63/1425 |
| 2022/0318399 | A1 * | 10/2022 | Rodler .................... G06F 21/51 |
| 2023/0188600 | A1 * | 6/2023 | Sulibhavi .................. H04L 9/50 709/224 |
| 2023/0362145 | A1 * | 11/2023 | Crabtree ............. H04L 63/1433 |
| 2024/0037551 | A1 * | 2/2024 | Reaux-Savonte ...... G06Q 20/06 |
| 2024/0080332 | A1 * | 3/2024 | Ganesh ................. G06F 21/577 |
| 2024/0333746 | A1 * | 10/2024 | Williams ................ H04L 51/02 |
| 2025/0055870 | A1 * | 2/2025 | Viswambharan ....... H04L 63/08 |

* cited by examiner

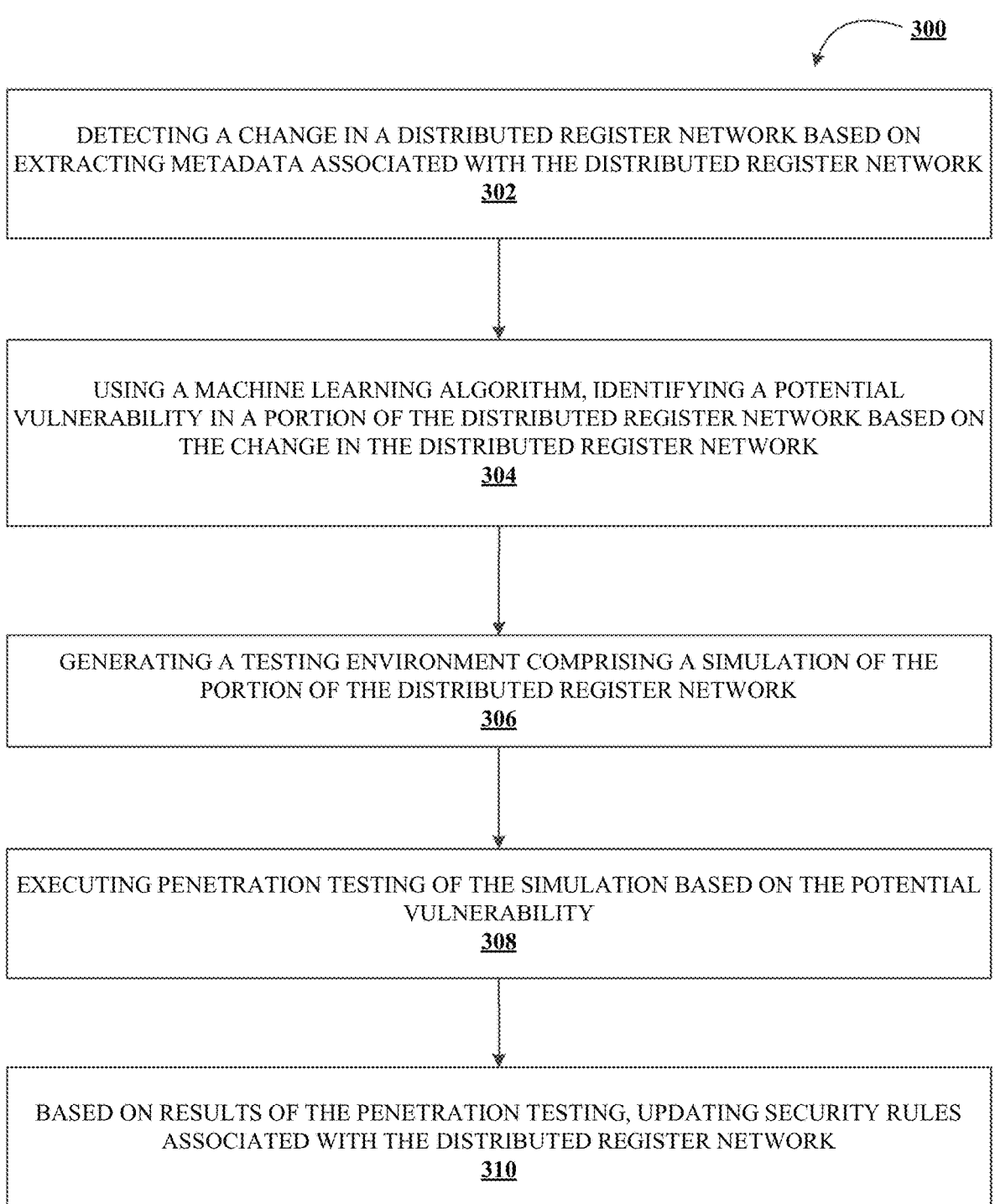

300

DETECTING A CHANGE IN A DISTRIBUTED REGISTER NETWORK BASED ON EXTRACTING METADATA ASSOCIATED WITH THE DISTRIBUTED REGISTER NETWORK
302

USING A MACHINE LEARNING ALGORITHM, IDENTIFYING A POTENTIAL VULNERABILITY IN A PORTION OF THE DISTRIBUTED REGISTER NETWORK BASED ON THE CHANGE IN THE DISTRIBUTED REGISTER NETWORK
304

GENERATING A TESTING ENVIRONMENT COMPRISING A SIMULATION OF THE PORTION OF THE DISTRIBUTED REGISTER NETWORK
306

EXECUTING PENETRATION TESTING OF THE SIMULATION BASED ON THE POTENTIAL VULNERABILITY
308

BASED ON RESULTS OF THE PENETRATION TESTING, UPDATING SECURITY RULES ASSOCIATED WITH THE DISTRIBUTED REGISTER NETWORK
310

FIG. 3

SYSTEM FOR INTELLIGENT AUTOMATED SIMULATION OF PENETRATION TESTING AND ISOLATION OF VULNERABLE DISTRIBUTED ELECTRONIC DATA REGISTERS

TECHNOLOGICAL FIELD

Example embodiments of the present disclosure relate to a system and method for intelligent automated simulation of penetration testing and isolation of vulnerable distributed electronic data registers.

BACKGROUND

There is a need for a way to perform penetration testing and remediation of distributed register systems.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for intelligent automated simulation of penetration testing and isolation of vulnerable distributed electronic data registers. In particular, the system may extract metadata regarding one or more nodes or sections of a distributed register. Based on the metadata, the system may generate a knowledge graph that may indicate the vulnerabilities associated with particular nodes, blocks, and/or sections of the distributed register. Based on the knowledge graph, the system may compute vulnerability scores for the various nodes, blocks, and/or sections, and generate a vulnerability heatmap based on the scores. The system may further be configured to allow a user to perform automatic simulated penetration tests on the vulnerable portions of the distributed register and/or execute one or more remediation process on such vulnerable portions. In this way, the system provides an efficient way to identify and remediate vulnerabilities within a distributed register.

Accordingly, embodiments of the present disclosure provide a system for intelligent automated simulation of penetration testing and isolation of vulnerable distributed electronic data registers, the system comprising a processing device; a non-transitory storage device containing instructions when executed by the processing device, causes the processing device to perform the steps of detecting a change in a distributed register network based on extracting metadata associated with the distributed register network; using a machine learning algorithm, identifying a potential vulnerability in a portion of the distributed register network based on the change in the distributed register network; generating a testing environment comprising a simulation of the portion of the distributed register network; executing penetration testing of the simulation based on the potential vulnerability; and based on results of the penetration testing, updating security rules associated with the distributed register network.

In some embodiments, the change in the distributed register network comprises at least one of an addition or removal of a node, a blockchain application update, or a change in a smart contract.

In some embodiments, the potential vulnerability is one of a consensus mechanism vulnerability, node vulnerability, encryption key vulnerability, or smart contract vulnerability.

In some embodiments, the machine learning algorithm comprises at least one of a long short-term memory ("LSTM"), generative adversarial network ("GAN"), or transformer.

In some embodiments, identifying the potential vulnerability comprises computing a vulnerability score associated with the portion of the distributed register network; and detecting that the vulnerability score exceeds a predefined threshold.

In some embodiments, the testing environment is generated and the penetration testing is executed based on receiving an artificial intelligence ("AI") based user input, the user input comprising one or more parameters for the penetration testing.

In some embodiments, the testing environment is generated and the penetration testing is executed automatically based on identifying the potential vulnerability.

Embodiments of the present disclosure also provide a computer program product for intelligent automated simulation of penetration testing and isolation of vulnerable distributed electronic data registers, the computer program product comprising a non-transitory computer-readable medium comprising code causing an apparatus to perform the steps of detecting a change in a distributed register network based on extracting metadata associated with the distributed register network; using a machine learning algorithm, identifying a potential vulnerability in a portion of the distributed register network based on the change in the distributed register network; generating a testing environment comprising a simulation of the portion of the distributed register network; executing penetration testing of the simulation based on the potential vulnerability; and based on results of the penetration testing, updating security rules associated with the distributed register network.

In some embodiments, the change in the distributed register network comprises at least one of an addition or removal of a node, a blockchain application update, or a change in a smart contract.

In some embodiments, the potential vulnerability is one of a consensus mechanism vulnerability, node vulnerability, encryption key vulnerability, or smart contract vulnerability.

In some embodiments, the machine learning algorithm comprises at least one of a long short-term memory ("LSTM"), generative adversarial network ("GAN"), or transformer.

In some embodiments, identifying the potential vulnerability comprises computing a vulnerability score associated with the portion of the distributed register network; and detecting that the vulnerability score exceeds a predefined threshold.

In some embodiments, the testing environment is generated and the penetration testing is executed based on receiving an artificial intelligence ("AI") based user input, the user input comprising one or more parameters for the penetration testing.

Embodiments of the present disclosure also provide a computer-implemented method for intelligent automated simulation of penetration testing and isolation of vulnerable distributed electronic data registers, the computer-implemented method comprising detecting a change in a distributed register network based on extracting metadata associated with the distributed register network; using a machine learning algorithm, identifying a potential vulnerability in a portion of the distributed register network based on the change in the distributed register network; generating a testing environment comprising a simulation of the portion of the distributed register network; executing penetration testing of the simulation based on the potential vulnerability; and based on results of the penetration testing, updating security rules associated with the distributed register network.

In some embodiments, the change in the distributed register network comprises at least one of an addition or removal of a node, a blockchain application update, or a change in a smart contract.

In some embodiments, the potential vulnerability is one of a consensus mechanism vulnerability, node vulnerability, encryption key vulnerability, or smart contract vulnerability.

In some embodiments, the machine learning algorithm comprises at least one of a long short-term memory ("LSTM"), generative adversarial network ("GAN"), or transformer.

In some embodiments, identifying the potential vulnerability comprises computing a vulnerability score associated with the portion of the distributed register network; and detecting that the vulnerability score exceeds a predefined threshold.

In some embodiments, the testing environment is generated and the penetration testing is executed based on receiving an artificial intelligence ("AI") based user input, the user input comprising one or more parameters for the penetration testing.

In some embodiments, the testing environment is generated and the penetration testing is executed automatically based on identifying the potential vulnerability.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
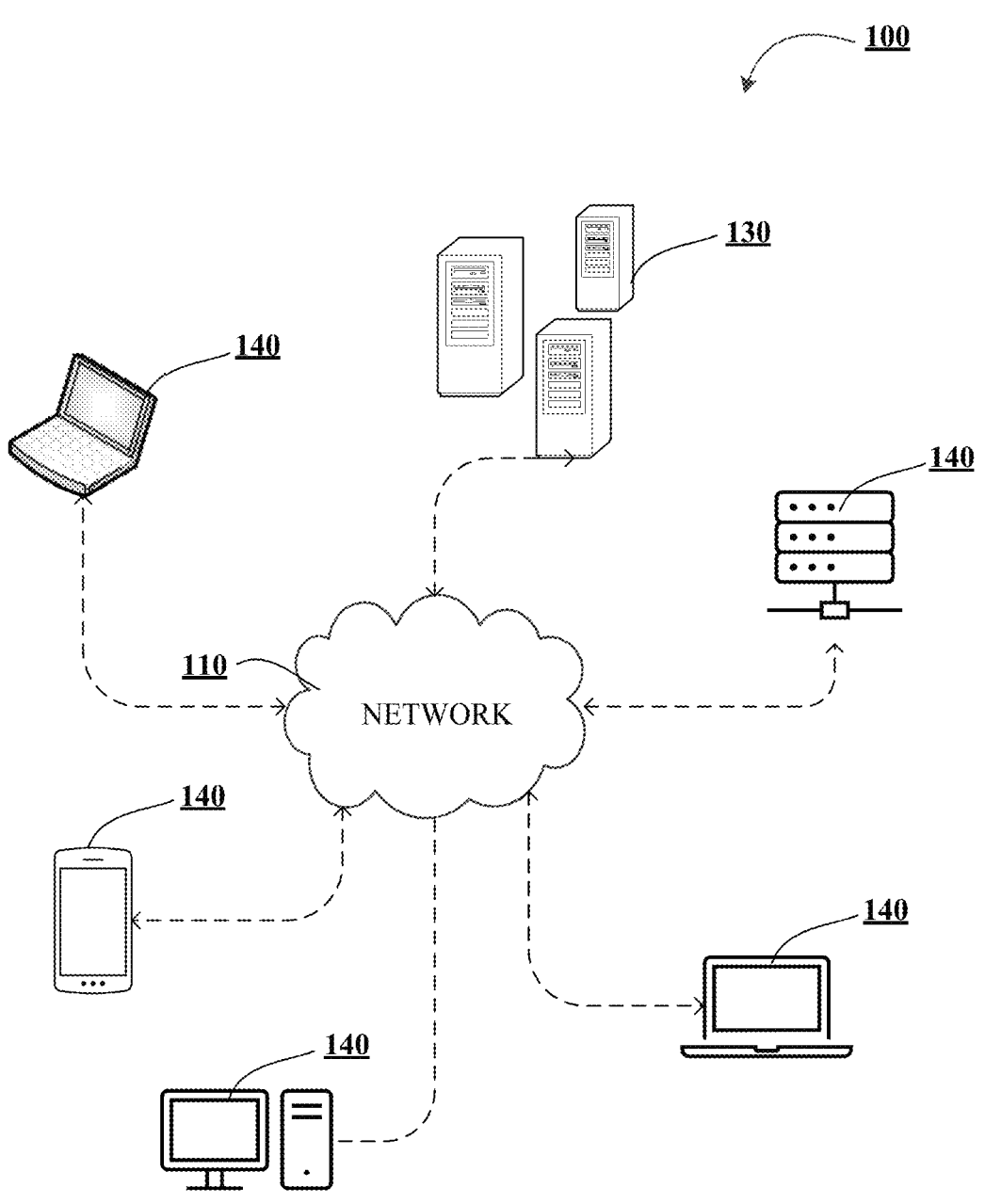
Figure 1B:
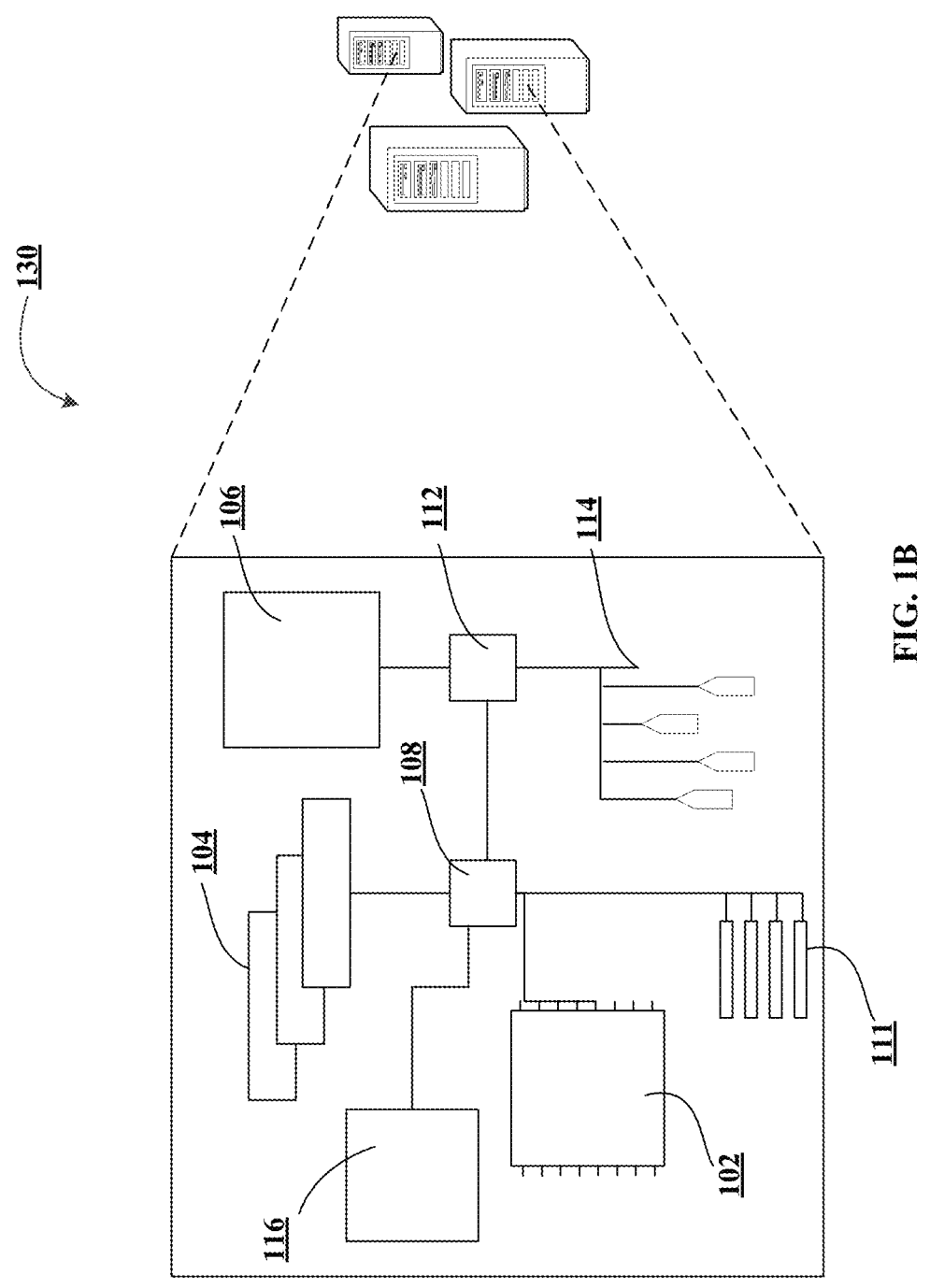
Figure 1C:
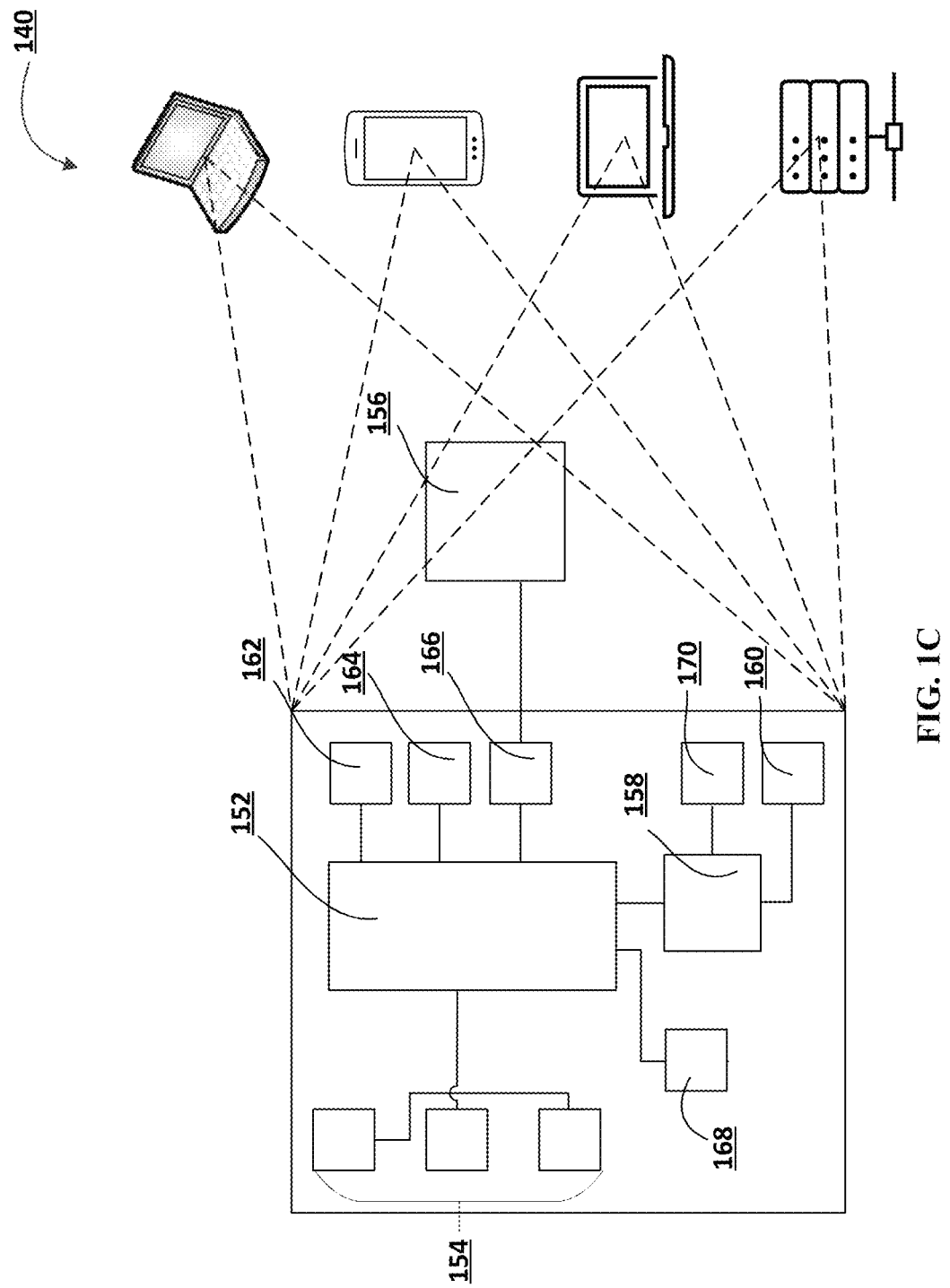
Figure 2A:
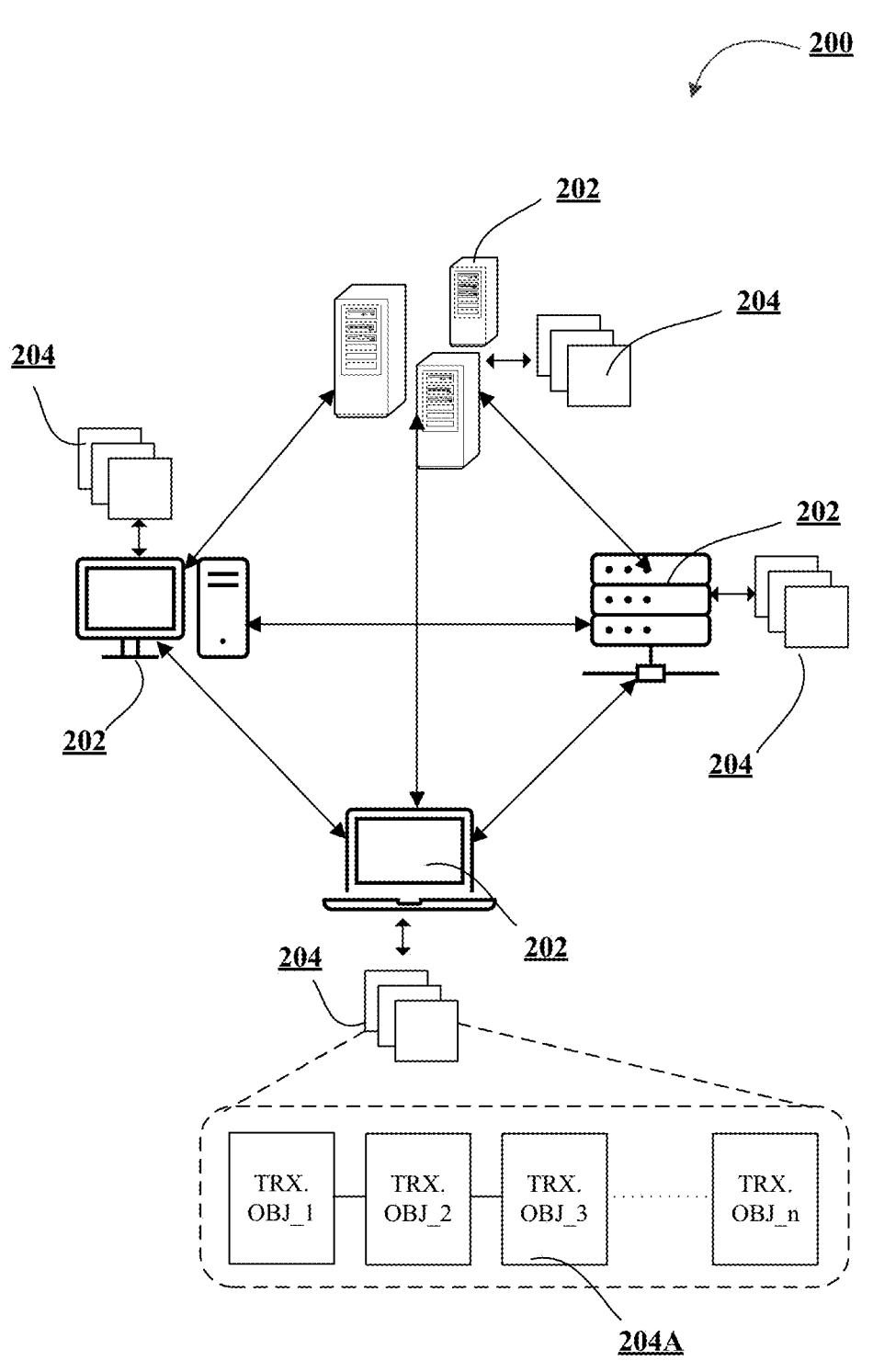
Figure 2B:
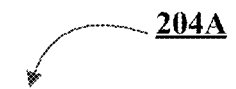
Figure 2B:
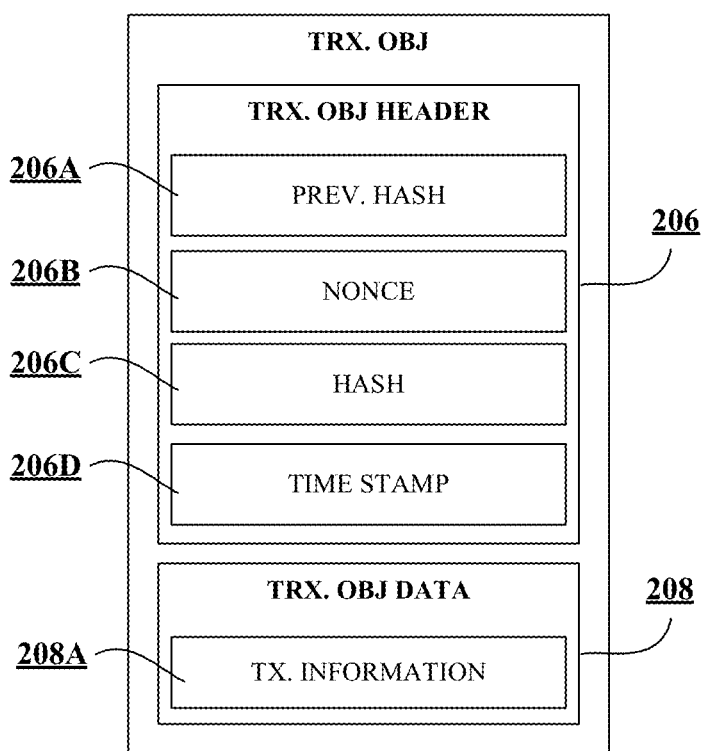

FIGS. 1A-1C illustrates technical components of an exemplary distributed computing environment for intelligent automated simulation of penetration testing and isolation of vulnerable distributed electronic data registers, in accordance with an embodiment of the disclosure;

FIG. 2A illustrates an exemplary distributed ledger technology (DLT) architecture, in accordance with an embodiment of the disclosure;

FIG. 2B illustrates an exemplary transaction object within the DLT architecture, in accordance with an embodiment of the disclosure;

FIG. 3 illustrates a method for intelligent automated simulation of penetration testing and isolation of vulnerable distributed electronic data registers, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, light-emitting diode (LED), light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, unique characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, investment vehicles, cryptographic and/or digital currencies, and/or the like. In yet other embodiments, the resources may include real-world goods or commodities that may be acquired and/or exchanged by a user.

"Cryptographic hash function" or "hash algorithm" as used herein may refer to a set of logical and/or mathematical operations or processes that may be executed on a specified segment of data to produce a hash output. Given a specified data input, the hash algorithm may produce a cryptographic hash output value which is a fixed-length character string. Examples of such hash algorithms may include message-digest algorithm 5 (MD5), Secure Hash Algorithm/SHA, or the like. According, "hashing" or "hashed" as used herein may refer to the process of producing a hash output based on a data input into a hash algorithm.

"Public-key cryptography" or "asymmetric cryptography" may refer to a process for data encryption and/or verification by which a pair of asymmetric corresponding cryptographic keys are generated (e.g., a "key pair" comprising a "public key" intended to be distributed and a "private key" intended to be possessed by a single user or device). Data encrypted using a public key may be decrypted only by the possessor of the corresponding private key. Furthermore, data signed with a private key may be validated by the possessor of the corresponding public key to verify the identity of the signer (which may be referred to herein as "digital signing").

Distributed registers (which may in some embodiments be blockchain ledgers) provide entities with a durable, decentralized platform on which to store data. In particular, the decentralized, consensus-based manner in which data is stored in the distributed register provides a degree of resistance to tampering of the data stored therein. Furthermore, the use of smart contracts may streamline and expedite the interactions between entities. That said, blockchain networks may nevertheless be susceptible to certain types of vulnerabilities that may cause the data and/or transactions occurring on the blockchain to be compromised by unauthorized parties. For instance, an entity may seek to control more than 50% of the mining power or consensus power within a blockchain network (which may be referred to herein as a "51% attack"). In other cases, public and/or private keys used on the blockchain may be compromised (a digital signature vulnerability). In yet other cases, a smart contract vulnerability may exist in which data transmitted between computing devices as a result of a smart contract may be intercepted and/or modified before reaching its intended recipient (a smart contract vulnerability). Accordingly, there is a need for a way to swiftly identify and remediate any distributed register vulnerabilities.

To address the above concerns among others, the system described herein provides a way to monitor, detect, and remediate distributed register vulnerabilities in real time. The system may continuously monitor the nodes, data, blocks, and/or networks within a distributed register network. In this regard, the system may extract metadata from a blockchain layer, data layer, consensus layer, and/or network layer associated with the distributed register. Based on the extracted metadata, the system may construct a knowledge graph comprising various types of information regarding the distributed register, such as the identity and/or location of the nodes, which nodes are hosting the ledger, what types of data are stored in the ledger, what type of distributed ledger technology is used to create the ledger, which nodes participate in consensus, which nodes are in communication with one another, which resources or nodes are involved in the operation of a blockchain application, what types of smart contracts are stored and/or executed, and/or the like.

Based on the knowledge graph, the system may identify a vulnerability that may affect a portion of the distributed register network. In this regard, the system may be configured to detect changes in the distributed register network environment over time. Examples of such changes may include, for instance, the addition of a new block to the blockchain ledger, the addition of a new node, the updates to the blockchain application and/or its dependencies, software or hardware upgrades performed on a node, performance issues or failure of a particular node, modifications to a smart contract, and/or the like. Based on detecting the change, the system may analyze the change in the distributed register network using a machine learning algorithm to assess the degree to which the change may create a vulnerability in one or more portions or sections of the distributed register network.

In some embodiments, the system may compute a vulnerability score for each node, block, or network within the distributed register network. The vulnerability score may be computed based on analyzing the distributed register network using one or more deep learning machine learning algorithms. Examples of such algorithms may include, for instance, long short-term memory networks ("LSTM"), recurrent neural networks ("RNNs"), transformers, generative adversarial networks ("GAN"), and/or the like. The vulnerability score may be based on the likelihood that a particular node, block, or network may be affected by the identified vulnerability, where higher scores reflect a higher likelihood, and lower scores reflect a lower likelihood. In some embodiments, the vulnerability scores may be included within a visual heatmap that may identify the vulnerable portions of the distributed register network. For instance, particularly vulnerable nodes or blocks may be identified and/or highlighted according to color, size, shape, and/or the like within the heatmap.

Based on identifying the vulnerability, the system may generate a testing environment that may include a simulation of the vulnerable portions of the distributed register network. In this regard, virtual copies of vulnerable nodes and/or blocks may be deployed into a virtual testing environment. In some embodiments, the testing environment may be generated automatically by the system in response to detecting the vulnerability. In other embodiments, the system may further be configured to receive user prompts or inputs regarding the manipulation and/or isolation of the sections of the distributed register to be tested. Once the testing environment has been generated, the system may automatically execute simulated penetration testing on the vulnerable sections of the distributed register within the testing environment.

The penetration testing may comprise, for instance, attempting to perform one or more actions that may compromise the security of the isolated sections of the DLT network according to the particular vulnerability that may affect the sections of the DLT network. For instance, the isolated section of the DLT network may comprise a large number of nodes that may be susceptible to a vulnerability that allows the consensus inputs or processes to be disrupted, thereby potentially allowing an entity to improperly gain more than 50% of the mining or consensus power. In such cases, the system may attempt to perform the actions or processes (e.g., execution or injection of unauthorized code, transmission of unauthorized payloads, and/or the like) on the sections of the DLT network replicated within the virtual environment (e.g., to influence the consensus inputs of the vulnerable nodes). In such a scenario, the processes may further include attempting to use the vulnerable nodes to publish and/or validate data records or blocks containing unauthorized or false data (e.g., false transactions). In this way, the system may confirm whether the relevant sections of the DLT network may in fact be subject to the vulnerabilities identified by the machine learning algorithms, and further determine the extent of the vulnerability and/or the potential repercussions that may result from the vulnerability.

If the existence of the vulnerability is confirmed through the results of the penetration testing, the system may automatically update one or more security rules associated with the distributed register network, which may include executing one or more remediation processes in response to the detected vulnerability. For instance, in the event that the system detects that a set of nodes are susceptible to the vulnerability, the system may perform network segmentation or isolation of the nodes, thereby preventing the nodes from participating in consensus, writing new blocks to the blockchain, from being accessed by other computing devices, and/or the like.

The system may comprise a user dashboard that may be accessed by one or more users (e.g., through a user computing device). The dashboard may comprise one or more interface elements to accept inputs from and provide outputs to the user. In this regard, the user may access the dashboard to view the heatmap of vulnerabilities of the distributed register. The heatmap may be, for instance, a scatter plot where the various nodes, blocks, and/or networks may be represented by points within the scatter plot. The points may be visualized by a shape such as a circle, where the size and/or color of the circle may correspond to the vulnerability score computed for each of the nodes, blocks, and/or networks. For instance, points with a larger circle or a deeper shade of a particular color (e.g., red) may represent nodes, blocks, and/or networks with relatively higher vulnerability scores. In this way, the system may provide an expedient way for the user to visually identify vulnerable sections within the DLT network.

In some embodiments, the user dashboard may further be configured to receive AI-based prompts to the system to generate the testing environment and/or perform penetration testing. For instance, the user may provide a text-based input in natural language (e.g., "Isolate and execute penetration testing on Network A."). The system may, based on natural language processing and/or understanding ("NLP" and/or "NLU") AI algorithms, parse and interpret the user's request to extract relevant parameters (e.g., penetration testing to be performed on "Network A") and execute the penetration testing based on the parameters as identified from the user's prompt.

An exemplary embodiment is provided as follows. It should be understood that the example is provided for illustrative purposes and should not be construed as restricting the scope of the disclosure provided herein. In one embodiment, a user may access the heatmap of a particular DLT network and identify a certain section of the blockchain (e.g., certain nodes within the DLT network) that appears to be highly vulnerable to a particular issue (e.g., exposure of cryptographic keys). Based on identifying the potentially vulnerable section, the user may submit an AI prompt to isolate the potentially vulnerable section and initiate penetration testing. The system may generate a virtual environment and instantiate a copy or virtual representation of the potentially vulnerable section, and subsequently initiate penetration testing, which may include executing one or more processes to attempt to gain access to the cryptographic keys that may be stored on the virtual nodes. Upon detecting that the penetration testing has succeeded, the system may update the security rules associated with the vulnerable nodes and/or initiate one or more remediation processes on the vulnerable nodes (e.g., performing operating system and/or software updates, updating encryption algorithms, adjusting security policies, reestablishing user and/or application permissions, and/or the like).

In another embodiment, the system may detect that a particular section of the blockchain (e.g., a particular series of blocks) is susceptible to a vulnerability. For instance, the vulnerable section of the blockchain may be used by unauthorized parties to publish false transactions, block legitimate transactions, and/or the like. In such an embodiment, the system may automatically initiate penetration testing of the vulnerable sections of the blockchain. Upon verifying that such vulnerabilities exist, the system may automatically perform isolation and/or segmentation of the vulnerable sections of the blockchain (e.g., preventing further blocks or data records from being added to the vulnerable sections), thereby automatically redirecting further pending blocks or data records to a secure section of the blockchain.

The system as described herein provides a number of technological benefits over conventional systems for distributed register security. In particular, by using a machine learning algorithm to detect potential vulnerabilities and compute vulnerability scores, the system may continually become more efficient at proactively identifying vulnerabilities within DLT networks. Furthermore, through automatic deployment of updated security rules and/or remediation processes, the system may address vulnerabilities on a real-time, continuous, and on-going basis.

FIGS. 1A-1C illustrate technical components of an exemplary distributed computing environment 100 for the system for intelligent automated simulation of penetration testing and isolation of vulnerable distributed electronic data registers, in accordance with one embodiment of the present disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an electrically erasable programmable read-only memory (EEPROM), flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., universal serial bus (USB), Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or non-volatile random-access memory (NVRAM) memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a Global Positioning System (GPS) device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP Transmission Control Protocol/Internet Protocol (TCP/IP)). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (second generation (2G), third generation (3G), fourth generation (4G), fifth generation (5G), and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIGS. 2A-2B illustrate an exemplary distributed ledger technology (DLT) architecture, in accordance with an embodiment of the invention. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT may use a peer-to-peer protocol for a cryptographically secured distributed ledger of transactions represented as transaction objects (which may also be referred to herein as "data records") that are linked. In some embodiments, the transaction objects or data records may contain state information about a resource that is tracked by the system. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT may use smart contracts. "Smart contracts" as used herein may refer to computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A "public distributed ledger" as referred to herein may refer to a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, a fully private distributed ledger may be a distributed ledger whereby permissions are kept centralized with one entity. The permissions may be public or restricted to an arbitrary extent. And lastly, a consortium distributed ledger may be a distributed ledger where the consensus process is controlled by a pre-selected set of nodes; for example, a distributed ledger may be associated with a number of member institutions (e.g., 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2A, the exemplary DLT architecture 200 includes a distributed ledger 204 being maintained on multiple devices (nodes) 202 that are authorized to keep track of the distributed ledger 204. For example, these nodes 202 may be computing devices such as system 130 and client device(s) 140. One node 202 in the DLT architecture 200 may have a complete or partial copy of the entire distributed ledger 204 or set of transactions and/or transaction objects 204A on the distributed ledger 204. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes. The transaction objects 204A may comprise an origin transaction object that may serve as the beginning of a chain of transaction objects, such that transaction objects 204A are added to the end of the chain beginning from the origin transaction object. In some embodiments, a subchain may be formed from any of the transaction objects 204A within the distributed ledger 204, where the subchain may comprise information relating to a specific resource tracked by the system.

As shown in FIG. 2B, an exemplary transaction object 204A may include a transaction header 206 and a transaction object data 208. The transaction header 206 may include a cryptographic hash of the previous transaction object 206A, a nonce 206B-a randomly generated 32-bit whole number when the transaction object is created, cryptographic hash of the current transaction object 206C wedded to the nonce 206B, and a time stamp 206D. The transaction object data 208 may include transaction information 208A being recorded. Once the transaction object 204A is generated, the transaction information 208A is considered signed and forever tied to its nonce 206B and hash 206C. Once generated, the transaction object 204A is then deployed on the distributed ledger 204. At this time, a distributed ledger address is generated for the transaction object 204A, i.e., an indication of where it is located on the distributed ledger 204 and captured for recording purposes. Once deployed, the transaction information 208A is considered recorded in the distributed ledger 204.

FIG. 3 illustrates a method 300 for intelligent automated simulation of penetration testing and isolation of vulnerable distributed electronic data registers, in accordance with an embodiment of the disclosure. As shown in block 302, the method includes detecting a change in a distributed register network based on extracting metadata associated with the distributed register network. The change may be, for instance, at least one of an addition or removal of a node to the DLT network, a software or application update, new blockchain application dependencies, changes in a smart contract, and/or the like. In this regard, the system may continuously, and/or in real time, retrieve metadata from the various nodes and/or supporting computing devices that make up the DLT network, where the metadata may include information associated with the nodes, blocks, and/or subnetworks or groups of the DLT network.

Next, as shown in block 304, the method includes, using a machine learning algorithm, identifying a potential vulnerability in a portion of the distributed register network based on the change in the distributed register network. The vulnerability may be, for instance, a consensus mechanism vulnerability, hardware or platform based vulnerability, node vulnerability, smart contract vulnerability, encryption or cryptographic vulnerability, and/or the like. In this regard, identifying the potential vulnerability may comprise constructing a knowledge graph from the extracted metadata and identifying the vulnerability using the knowledge graph. The machine learning algorithm may include, for instance, LSTMs, transformers, GANs, and/or the like. In some embodiments, identifying the potential vulnerability may further comprise computing vulnerability scores for a plurality of nodes and blocks within the distributed register network, and detecting that the vulnerability score for at least a portion of the plurality of nodes and blocks exceeds a predefined threshold.

Next, as shown in block 306, the method includes generating a testing environment comprising a simulation of the portion of the distributed register network. The testing environment may be, in one embodiment, a sandboxed virtual environment where the simulation of the portion of the distributed register network is a virtualized copy of the hardware and/or software components of the portion of the distributed register network. For instance, if the portion to be tested is a series of nodes, the virtual copy may include a virtualized representation of the nodes, which may include the various hardware and/or software components that make up the nodes. In other embodiments, the portion of the distributed register network may comprise a series of blocks within a blockchain ledger that the system has identified to be potentially vulnerable. In one embodiment, the testing environment may be generated based on receiving an AI-based user input comprising one or more parameters for the penetration testing. In other embodiments, the testing environment and/or the penetration testing may be initiated automatically upon detecting the potentially vulnerable section of the distributed register network.

Next, as shown in block 308, the method includes executing penetration testing of the simulation based on the potential vulnerability. In this regard, executing the penetration testing may include executing one or more processes to compromise the security or integrity of the portion of the distributed register network, where the processes may be selected based on the detected potential vulnerability. In this regard, the one or more processes may include controlling consensus inputs of one or more nodes, intercepting data transmissions between nodes (e.g., transmissions made based on smart contracts), executing unauthorized code, breaking encryption, gaining access to cryptographic keys, and/or the like.

Next, as shown in block 310, the method includes based on results of the penetration testing, updating security rules associated with the distributed register network. In some embodiments, updating the security rules may further comprise executing one or more remediation processes to address the vulnerability. For instance, the one or more remediation processes may include network isolation of vulnerable nodes, decoupling of vulnerable blocks, software and/or hardware updates, updating security policies, and/or the like. In cases in which vulnerable blocks are decoupled, the remediation processes may further comprise detecting an incoming transaction to the distributed register network, and redirecting the transaction to a secure section of the block-chain ledger.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for intelligent automated simulation of penetration testing and isolation of vulnerable distributed electronic data registers, the system comprising:

a processing device;

a non-transitory storage device containing instructions when executed by the processing device, causes the processing device to perform the steps of:

continuously monitoring a distributed register network to extract metadata associated with the distributed register network;

based on the extracted metadata, constructing a knowledge graph comprising information regarding the distributed register network;

detecting a change in the distributed register network based on the knowledge graph;

using a machine learning algorithm, identifying a potential vulnerability in a portion of the distributed register network based on the change in the distributed register network wherein identifying the potential vulnerability comprises:

computing a vulnerability score for each node, block, and network of the distributed register network; and generating a visual heatmap of the vulnerability scores comprising a scatter plot with each node, block, and network of the distributed register network represented by points within the scatter plot, wherein a size and a color of the points correspond to the vulnerability scores;

generating a testing environment comprising a simulation of the portion of the distributed register network;

executing penetration testing of the simulation based on the potential vulnerability; and based on results of the penetration testing, updating security rules associated with the distributed register network.

2. The system of claim 1, wherein the change in the distributed register network comprises at least one of an addition or removal of a node, a blockchain application update, or a change in a smart contract.

3. The system of claim 1, wherein the potential vulnerability is one of a consensus mechanism vulnerability, node vulnerability, encryption key vulnerability, or smart contract vulnerability.

4. The system of claim 1, wherein the machine learning algorithm comprises at least one of a long short-term memory ("LSTM"), generative adversarial network ("GAN"), or transformer.

5. The system of claim 1, wherein identifying the potential vulnerability comprises:

computing a vulnerability score associated with the portion of the distributed register network; and detecting that the vulnerability score exceeds a predefined threshold.

6. The system of claim 1, wherein the testing environment is generated and the penetration testing is executed based on receiving an artificial intelligence ("AI") based user input, the user input comprising one or more parameters for the penetration testing.

7. The system of claim 1, wherein the testing environment is a sandboxed virtual environment where the simulation of the portion of the distributed register network is a virtualized copy of components of the portion of the distributed register network.

8. A computer program product for intelligent automated simulation of penetration testing and isolation of vulnerable distributed electronic data registers, the computer program product comprising a non-transitory computer-readable medium comprising code causing an apparatus to perform the steps of:

continuously monitoring a distributed register network to extract metadata associated with the distributed register network;

based on the extracted metadata, constructing a knowledge graph comprising information regarding the distributed register network;

detecting a change in the distributed register network based on the knowledge graph;

using a machine learning algorithm, identifying a potential vulnerability in a portion of the distributed register network based on the change in the distributed register network, wherein identifying the potential vulnerability comprises:

computing a vulnerability score for each node, block, and network of the distributed register network; and generating a visual heatmap of the vulnerability scores comprising a scatter plot with each node, block, and network of the distributed register network represented by points within the scatter plot, wherein a size and a color of the points correspond to the vulnerability scores;

generating a testing environment comprising a simulation of the portion of the distributed register network;

executing penetration testing of the simulation based on the potential vulnerability; and based on results of the penetration testing, updating security rules associated with the distributed register network.

9. The computer program product of claim 8, wherein the change in the distributed register network comprises at least one of an addition or removal of a node, a blockchain application update, or a change in a smart contract.

10. The computer program product of claim 8, wherein the potential vulnerability is one of a consensus mechanism vulnerability, node vulnerability, encryption key vulnerability, or smart contract vulnerability.

11. The computer program product of claim 8, wherein the machine learning algorithm comprises at least one of a long short-term memory ("LSTM"), generative adversarial network ("GAN"), or transformer.

12. The computer program product of claim 8, wherein identifying the potential vulnerability comprises:

computing a vulnerability score associated with the portion of the distributed register network; and detecting that the vulnerability score exceeds a predefined threshold.

13. The computer program product of claim 8, wherein the testing environment is generated and the penetration testing is executed based on receiving an artificial intelligence ("AI") based user input, the user input comprising one or more parameters for the penetration testing.

14. A computer-implemented method for intelligent automated simulation of penetration testing and isolation of vulnerable distributed electronic data registers, the computer-implemented method comprising:

continuously monitoring a distributed register network to extract metadata associated with the distributed register network;

based on the extracted metadata, constructing a knowledge graph comprising information regarding the distributed register network;

detecting a change in the distributed register network based on the knowledge graph;

using a machine learning algorithm, identifying a potential vulnerability in a portion of the distributed register network based on the change in the distributed register network, wherein identifying the potential vulnerability comprises:

computing a vulnerability score for each node, block, and network of the distributed register network; and generating a visual heatmap of the vulnerability scores comprising a scatter plot with each node, block, and network of the distributed register network represented by points within the scatter plot, wherein a size and a color of the points correspond to the vulnerability scores;

generating a testing environment comprising a simulation of the portion of the distributed register network;

executing penetration testing of the simulation based on the potential vulnerability; and based on results of the penetration testing, updating security rules associated with the distributed register network.

15. The computer-implemented method of claim 14, wherein the change in the distributed register network comprises at least one of an addition or removal of a node, a blockchain application update, or a change in a smart contract.

16. The computer-implemented method of claim 14, wherein the potential vulnerability is one of a consensus mechanism vulnerability, node vulnerability, encryption key vulnerability, or smart contract vulnerability.

17. The computer-implemented method of claim 14, wherein the machine learning algorithm comprises at least one of a long short-term memory ("LSTM"), generative adversarial network ("GAN"), or transformer.

18. The computer-implemented method of claim 14, wherein identifying the potential vulnerability comprises:

computing a vulnerability score associated with the portion of the distributed register network; and detecting that the vulnerability score exceeds a predefined threshold.

19. The computer-implemented method of claim 14, wherein the testing environment is generated and the penetration testing is executed based on receiving an artificial intelligence ("AI") based user input, the user input comprising one or more parameters for the penetration testing.

* * * * *